(12) United States Patent
Katsuyama (10) Patent No.: US 10,897,545 B2
(45) Date of Patent: Jan. 19, 2021

(54) DISPLAY-AND-OPERATION DEVICE AND IMAGE FORMING APPARATUS

(71) Applicant: Goro Katsuyama, Kanagawa (JP)

(72) Inventor: Goro Katsuyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 3 days.

(21) Appl. No.: 16/299,301

(22) Filed: Mar. 12, 2019

(65) Prior Publication Data

US 2019/0289141 A1 Sep. 19, 2019

(30) Foreign Application Priority Data

Mar. 16, 2018 (JP) .................................. 2018-049447

(51) Int. Cl.
*H04N 1/00* (2006.01)
*H04W 4/80* (2018.01)

(52) U.S. Cl.
CPC ..... *H04N 1/00315* (2013.01); *H04N 1/00129* (2013.01); *H04N 1/00496* (2013.01); *H04W 4/80* (2018.02)

(58) Field of Classification Search
None
See application file for complete search history.

(56) References Cited

U.S. PATENT DOCUMENTS

| 2012/0238326 A1* | 9/2012 | Mori ................... H04M 1/0235 455/566 |
| 2013/0155450 A1* | 6/2013 | Higashikawa ........... B41J 29/13 358/1.15 |
| 2014/0327926 A1 | 11/2014 | Katsuyama |

FOREIGN PATENT DOCUMENTS

| JP | 2001-230893 | 8/2001 |
| JP | 2017-196747 | 11/2007 |
| JP | 2013-147015 | 8/2013 |
| JP | 2014-096717 | 5/2014 |
| JP | 2014-232305 | 12/2014 |
| JP | 2015-046830 | 3/2015 |
| JP | 2016-221765 | 12/2016 |
| JP | 2017-028477 | 2/2017 |

* cited by examiner

*Primary Examiner* — Dov Popovici
(74) *Attorney, Agent, or Firm* — Harness, Dickey and Pierce, P.L.C.

(57) ABSTRACT

A display-and-operation device includes a housing, a display operation panel, a plurality of wireless communicators, and a control board. The display operation panel forms a display operation screen on an outer surface of the housing. The plurality of wireless communicators are included in the housing and each having an antenna to perform wireless communication with a communication object. The control board controls the display operation panel. The control board is included in the housing. The plurality of wireless communicators are arranged on a same side of the display operation screen.

17 Claims, 4 Drawing Sheets

DISPLAY-AND-OPERATION DEVICE AND IMAGE FORMING APPARATUS

CROSS-REFERENCE TO RELATED APPLICATION

This patent application is based on and claims priority pursuant to 35 U.S.C. § 119(a) to Japanese Patent Application No. 2018-049447, filed on Mar. 16, 2018, in the Japan Patent Office, the entire disclosure of which is incorporated by reference herein.

BACKGROUND

Technical Field

Aspects of the present disclosure relate to a display-and-operation device and an image forming apparatus.

Related Art

In recent years, in image forming apparatuses such as copying machines and printers, a technique to transmit information from a terminal device such as a cellular phone or a smartphone using near field wireless communication such as near field communication (NFC) to operate various devices is adopted.

As an image forming apparatus capable of performing such wireless communication, for example, a configuration in which antennas (a first antenna and a second antenna) are built in on both sides of a display-and-operation device (touch panel type display) provided to the main body of the apparatus is proposed.

SUMMARY

In an aspect of the present disclosure, there is provided a display-and-operation device that includes a housing, a display operation panel, a plurality of wireless communicators, and a control board. The display operation panel forms a display operation screen on an outer surface of the housing. The plurality of wireless communicators are included in the housing and each having an antenna to perform wireless communication with a communication object. The control board controls the display operation panel. The control board is included in the housing. The plurality of wireless communicators are arranged on a same side of the display operation screen.

In an aspect of the present disclosure, there is provided an image forming apparatus that includes the display-and-operation device.

BRIEF DESCRIPTION OF THE DRAWINGS

The aforementioned and other aspects, features, and advantages of the present disclosure would be better understood by reference to the following detailed description when considered in connection with the accompanying drawings, wherein.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

Figure 1:
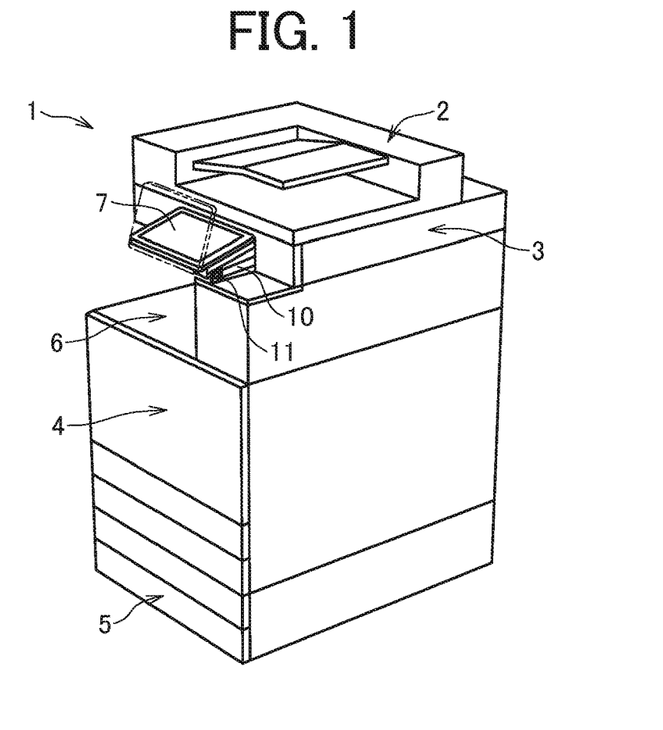
FIG. 1 is a perspective view of an image forming apparatus according to one embodiment of the present disclosure.

FIG. 1 is a perspective view of an image forming apparatus according to one embodiment of the present disclosure.

The image forming apparatus 1 illustrated in FIG. 1 is an copying machine including a document conveyor 2, an image reader 3 to read image information of a document conveyed by the document conveyor 2, an image former 4 to form an image on a paper as a recording medium on the basis of image information read by the image reader 3 or image information transmitted from an external terminal, a paper feeder 5 to supply paper to the image former 4, a paper ejector 6 to eject the paper on which the image is formed to the outside, and a display-and-operation device 7 to perform a printing instruction, to input various settings, and so on. Note that the image forming apparatus according to an embodiment of the present disclosure is not limited to copying machines, but may be a printer, a plotter, a facsimile machine, or multifunction peripherals of such devices.

As illustrated in FIG. 1, the display-and-operation device 7 is provided on the upper front side (a side facing the operator) of the main body of the image forming apparatus. In the present embodiment, a base 10 projecting forward from the front side of the main body of the image forming apparatus is included, and the display-and-operation device 7 is provided on the base 10 via an angle changing means 11 including a hinge mechanism. The display-and-operation device 7 rotates about the rotation axis of the angle changing means 11 included at the front end of the base 10, which allows the angle of the display-and-operation device 7 to be adjusted between a flat attitude as indicated by a solid line in FIG. 1 and an upright attitude indicated by a two-dot chain line in FIG. 1.

Figure 2:
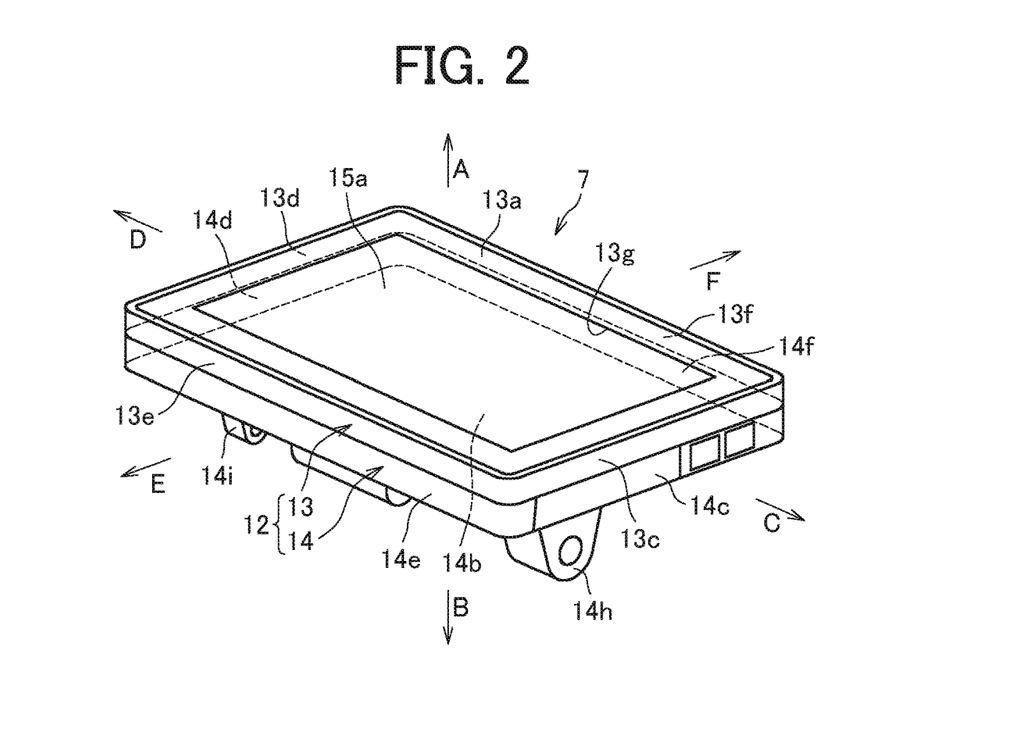
FIG. 2 is a perspective view of a display-and-operation device.

FIG. 2 is a perspective view of the display-and-operation device 7.

Hereinafter, in the explanation of the display-and-operation device 7, respective directions of the display-and-operation device 7 are defined for the display-and-operation device 7 in the flat attitude that is in a substantially horizontal state illustrated in FIG. 2. That is, descriptions are given with the direction of arrow A in FIG. 2 as being "up," the direction of arrow B as being "down," the direction of arrow C as being "right," the direction of arrow D as being "left," the direction of arrow E as being "front," and the direction of arrow F as being "back."

As illustrated in FIG. 2, the display-and-operation device 7 includes a housing 12 made of resin and including a front cover 13 as a first housing and a back cover 14 as a second housing. The front cover 13 is a rectangular frame body including a front portion 13a in which a rectangular hole 13g, where a display operation screen 15a is arranged, is formed and four side portions 13c, 13d, 13e, and 13f arranged around the front portion 13a so as to intersect with (be orthogonal to) the front portion 13a. The back cover 14 is a member having a thin case shape including a rectangular back portion 14b forming an outer surface on the opposite side to the front portion 13a of the front cover 13 and four side portions 14c, 14d, 14e, and 14f arranged around the back portion 14b so as to intersect with (be orthogonal to) the back portion 14b. The front cover 13 and the back cover 14 are assembled in the vertical direction by engagement between engagement portions included on side portions of the both covers. Two protrusions 14h and 14i forming the hinge mechanism of the angle changing means 11 are provided on the left and the right ends on the back portion 14b of the back cover 14. The display-and-operation device 7 is rotatably coupled to the base 10 via the protrusions 14h and 14i.

Figure 3:
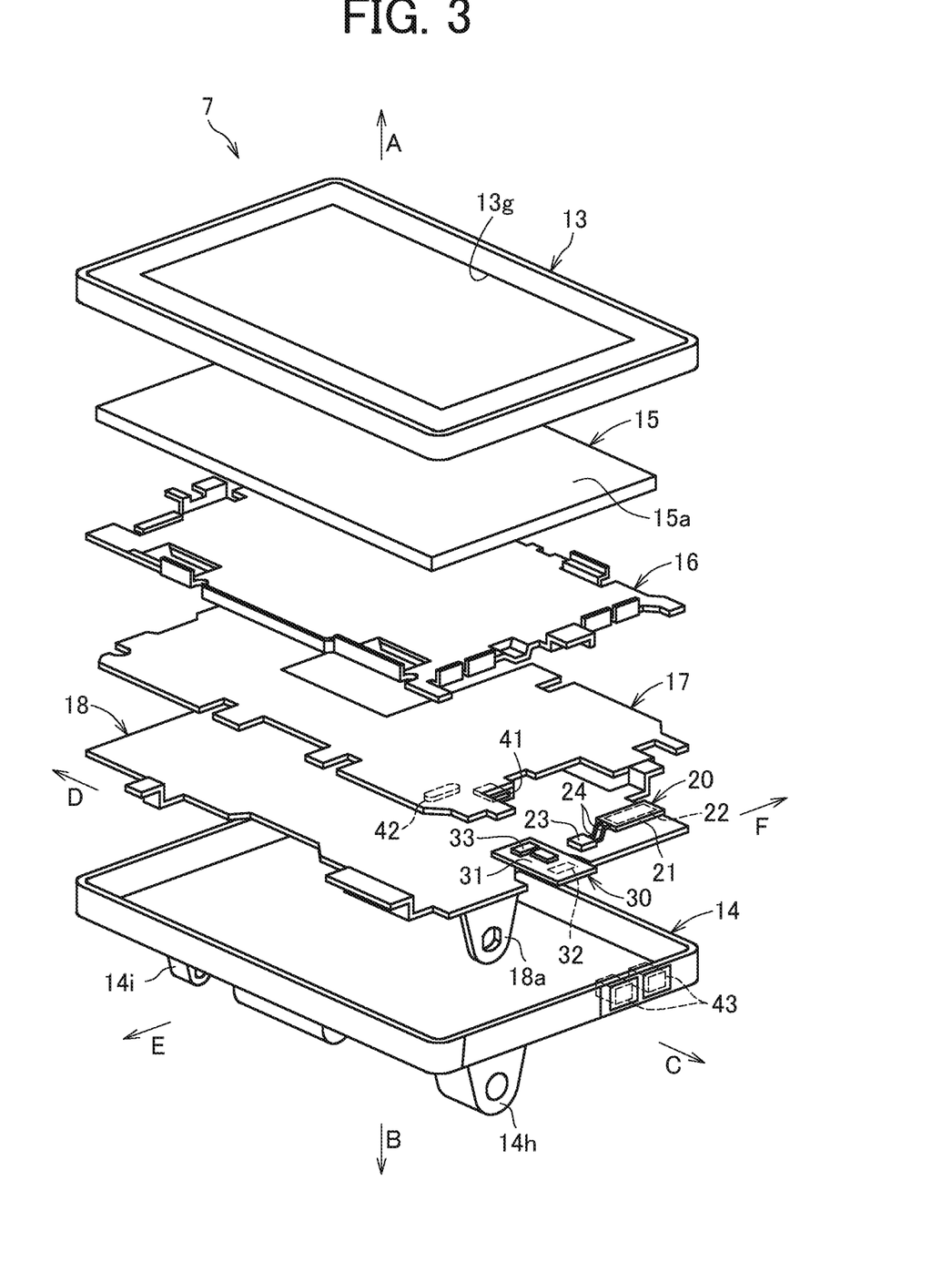
FIG. 3 is an exploded perspective view of the display-and-operation device.

FIG. 3 is an exploded perspective view of the display-and-operation device 7.

The directions indicated by arrows A to F in FIG. 3 are the same as the directions in FIG. 2.

As illustrated in FIG. 3, the display-and-operation device 7 includes the front cover 13, the back cover 14, a display operation panel 15, a holding frame 16, a control board 17, a coupling frame 18, a first wireless communicator 20, and a second wireless communicator 30. The display operation panel 15, the holding frame 16, the control board 17, the coupling frame 18, the first wireless communicator 20, and the second wireless communicator 30 are housed between the front cover 13 and the back cover 14.

The display operation panel 15 includes a pressure-sensitive or electrostatic touch sensor of a sheet shape superimposed on a liquid crystal display module. That is, the display operation panel 15 is of a so-called touch panel type that allows an operator to operate operation keys (characters, pictures, etc.) displayed on the liquid crystal display module by touching the touch sensor. The display operation panel 15 is sandwiched and held between the holding frame 16 and the front cover 13 with the holding frame 16 made of metal secured to the front cover 13 with screws from below. With the display operation panel 15 held in this manner, the top surface of the display operation panel 15 is exposed from the hole 13g of the front cover 13, thereby forming a rectangular display operation screen 15a on the top surface (outer surface) of the front cover 13.

The control board 17 is electrically connected to the liquid crystal display module and the touch sensor of the display operation panel 15 and performs display control of the liquid crystal display module and reception of input signals from the touch sensor to control the display operation panel 15. The control board 17 is sandwiched and held between the coupling frame 18 and the holding frame 16 with the coupling frame 18 made of metal secured to the holding frame 16 with screws from below.

A projecting piece 18a projecting downward is provided on the right end of the coupling frame 18. This projecting piece 18a is a part forming the hinge mechanism of the angle changing means 11. In a state in which the respective components of the display-and-operation device 7 are assembled, the projecting piece 18a is housed in the protrusion 14h provided on the right end of the back cover 14 and is coupled to a rotating shaft of the angle changing means 11. Note that, in the present embodiment, the load of rotational torque at the time of angle adjustment is applied only to the right side, and thus the projecting piece 18a for receiving this load is provided only on the right end of the coupling frame 18.

The first wireless communicator 20 and the second wireless communicator 30 perform wireless communication with a communication object such as a smartphone or a tablet terminal possessed by an operator. The first wireless communicator 20 and the second wireless communicator 30 have wireless communication boards 21 and 31, loop-shaped antennas 22 and 32, and connectors 23 and 33, respectively. Note that the connector 23 of the first wireless communicator 20 is provided to the wireless communication board 21 via a cable 24. On the other hand, the connector 33 of the second wireless communicator 30 is provided to the wireless communication board 31 without a cable. With the connectors 23 and 33 connected to the connectors 41 and 42, respectively, included on the control board 17, the first wireless communicator 20 and the second wireless communicator 30 are electrically connected to the control board 17.

Here, although both the first wireless communicator 20 and the second wireless communicator 30 are provided for the purpose of short-range wireless communication for performing transmission and reception of information to and from a communication object that is placed (close to or to be in contact with) the front cover 13 of the housing 12, different communication systems are adopted for the first wireless communicator 20 and the second wireless communicator 30 since the wireless communicators are selectively used depending on the intended use of the operator. Specifically, in the present embodiment, the communication system of the near field communication (NFC) is adopted for the first wireless communicator 20 and Bluetooth (registered trademark) communication system is adopted for the second wireless communicator 30.

The communicable range of the first wireless communicator 20 (NFC) with respect to a communication object is set to a relatively short distance (for example, 10 cm or less). On the other hand, the communicable range of the second wireless communicator 30 (Bluetooth) is set to be longer than the communicable range for the first wireless communicator 20. The communicable range referred to here is a communication range measured in an environment in which communication can be performed between a communication object and an antenna without interference. Generally, Bluetooth enables wireless communication within a range of about several meters to several tens of meters; however, in the present embodiment, in order to avoid radio wave interference and crosstalk with a wireless communicator installed in another image forming apparatus installed in the surroundings, the antenna 32 of the second wireless communicator 30 is intentionally downsized to set the communicable range to be shorter than usual.

Figure 4:
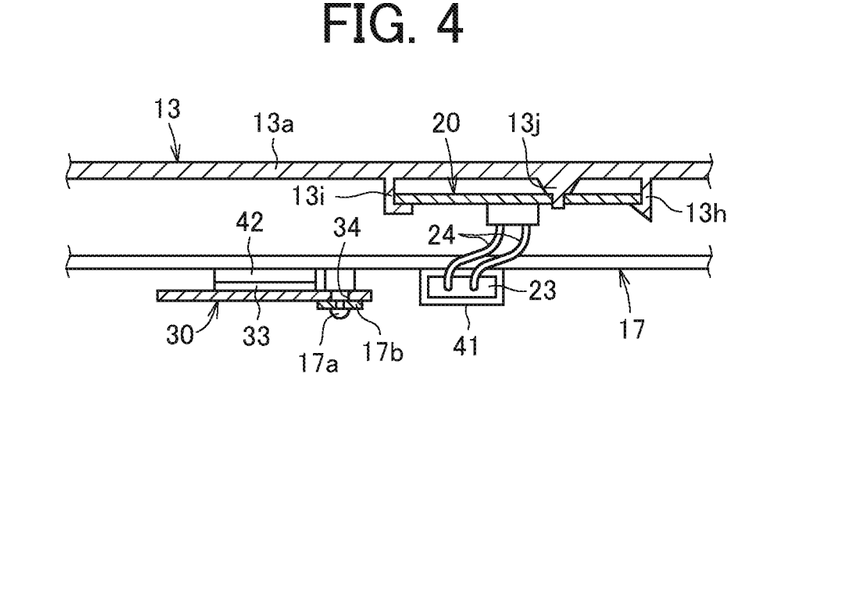
FIG. 4 is a diagram illustrating an arrangement relationship in the vertical direction between a first wireless communicator and a second wireless communicator.

FIG. 4 is a diagram illustrating an arrangement relationship in the vertical direction between the first wireless communicator 20 and the second wireless communicator 30.

As described above, the first wireless communicator 20 is set to have a shorter communicable range with respect to a communication object as compared to the second wireless communicator 30, and thus as illustrated in FIG. 4, the first wireless communicator 20 is arranged at a position closer to (upper) the front portion 13a of the front cover 13, to which the communication object is placed close, than the second wireless communicator 30 is. On the other hand, since the communicable range of the second wireless communicator 30 is set to be longer than the communicable range of the first wireless communicator 20, the second wireless communicator 30 is arranged at a position away downward from the front portion 13a of the front cover 13 as compared to the first wireless communicator 20 is.

As described above, in the present embodiment, since the first wireless communicator 20 is arranged at a position close to the front portion 13a of the front cover 13, the first wireless communicator 20 is attached to an inner surface (lower surface) of the front portion 13a. Specifically, as illustrated in FIG. 4, the first wireless communicator 20 is secured by claw-like engagement portions 13h and 13i and a positioning protrusion 13j provided on the inner surface of the front portion 13a, thereby allowing the first wireless communicator 20 to be attached to the front cover 13.

Meanwhile, the second wireless communicator 30 is attached under the control board 17. Specifically, as illustrated in FIG. 4, a pin-like projection 17a provided on the control board 17 is inserted through a hole 34 formed in the second wireless communicator 30. On the tip side of the inserted projection 17a, a stopper 17b is attached, thereby preventing detachment of the second wireless communicator 30 from the projection 17a. Moreover, the connector 33 of the second wireless communicator 30 is coupled to the connector 42 of the control board 17, and this connection between the connectors 33 and 42 also functions as a means to attach (secure) the second wireless communicator 30 to the control board 17.

Note that in a case where the second wireless communicator 30 can be prevented from coming off the control board 17 by the fixing force of the connection between the connectors 33 and 42, the projection 17a and the stopper 17b may be eliminated. However, in the present embodiment, since the connector 33 is arranged closer to the left end of the second wireless communicator 30 (see FIG. 3), if only the connection between the connectors 33 and 42, there is a possibility that the second wireless communicator 30 is cantilevered and not stable. Therefore, in the present embodiment, in order to securely fix the second wireless communicator 30 to the control board 17, fixation by the projection 17a and the stopper 17b is employed on the end side opposite to the connector 33 side.

Meanwhile, since the connector 23 of the first wireless communicator 20 is provided on the wireless communication board 21 via the cable 24, the connection between the connectors 23 and 41 does not function as a means to secure the first wireless communicator 20. As described above, as a result of that the first wireless communicator 20 is arranged at a position close to the front portion 13a of the front cover 13, the first wireless communicator 20 is arranged at a position away upward from the control board 17 on the contrary. Thus, the connector 23 with the cable 24 is used so as to be coupled to the connector 41 of the control board 17 at a distant position.

Incidentally, in a configuration in which a display-and-operation device has two wireless communicators like the image forming apparatus according to the present embodiment, in a case where one wireless communicator is arranged on the right side of a display operation screen and another wireless communicator is arranged on the left side of the display operation screen, the display-and-operation device becomes large in the left-right direction since it is necessary to secure installation spaces for the wireless communicators on both the left and the right sides of the display operation screen. Also, in this case, since the positions to which a communication object is to be placed close are different depending on when an operator uses one of the wireless communicators and when the other wireless communicator is used, there are cases where it is difficult to recognize the position to which the communication object is to be placed close, or it is troublesome to operate.

Figure 5:
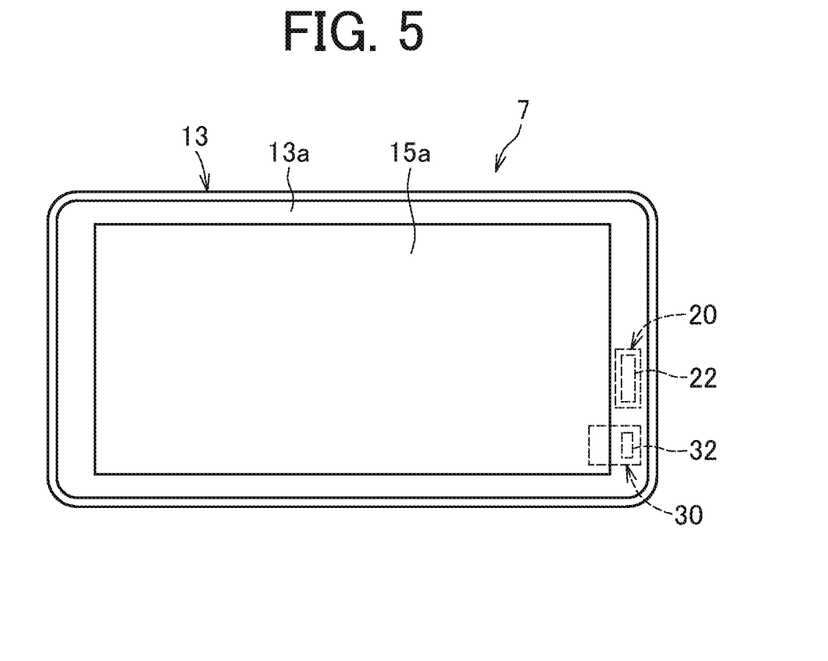
FIG. 5 is a diagram illustrating an arrangement of the first wireless communicator and the second wireless communicator as viewed from a side of a display operation screen.

Therefore, in the present embodiment, as illustrated in FIG. 5, both the first wireless communicator 20 and the second wireless communicator 30 are arranged on the right side of the display operation screen 15a. In this manner, by integrating installation positions of the two wireless communicators 20 and 30 on the same single side (positions corresponding to the same side) out of the four sides of the rectangular (rectangular or square) display operation screen 15a, the display-and-operation device 7 can be downsized as compared with a case where these wireless communicators 20 and 30 are arranged on separate sides.

In addition, since the two wireless communicators 20 and 30 (in particular, the antennas 22 and 32) are arranged on the same single side of the display operation screen 15a, an operator is only required to place a communication object, which the operator is holding, close to a position on the same single side of the display operation screen 15a to communicate with either one of the wireless communicators 20 and 30. That is, since the operator does not have to switch the location to which the communication object is to be placed close depending on which one of the wireless communicators 20 and 30 is to be used, it is easy to understand where to place the communication object, which can eliminate the trouble of operation of the case where locations to place the communication object are different. Furthermore, marking an area on the front cover 13 that is capable of wireless communication with each of the wireless communicators 20 and 30 facilitates an operator to understand a position where to place a communication object.

Furthermore, in the present embodiment, like the wireless communicators 20 and 30, a universal serial bus (USB) terminal to connect an external device such as a card authentication device and an external device coupler 43 (see FIG. 3) such as a high-definition multimedia interface (HDMI) (registered trademark) terminal are also provided on the right side of the display operation screen 15a, and thus the display-and-operation device 7 is compact and easy to use. In consideration of the fact that there are many right-handed operators in general, the wireless communicators 20 and 30 and so on are arranged on the right side of the display operation screen 15a; however, the wireless communicators 20 and 30 may be arranged on the left side or on the front side or on the back side as long as the arrangement is on the same single side of the display operation screen 15a.

As illustrated in FIG. 5, moreover in the present embodiment, the first wireless communicator 20 and the second wireless communicator 30 are arranged to be displaced from each other in the front-back direction as viewed from the display operation screen 15a side. Since the two wireless communicators 20 and 30 (in particular, the antennas 22 and 32) are arranged to be displaced from each other in the front-back direction in this manner, the size of the display-and-operation device 7 can be avoided from being large while deterioration of communication sensitivity due to close arrangement of the antennas 22 and 32 can be prevented. In the present embodiment, although the second wireless communicator 30 is set to have a higher communication sensitivity than the first wireless communicator 20 does, if the antenna 22 of the first wireless communicator 20 is arranged above the antenna 32 of the second wireless communicator 30, the antenna 22 of the first wireless communicator 20 more or less shields radio waves to the second wireless communicator 30. This is not preferable from the perspective of communication stability. Therefore, by arranging the antennas 22 and 32 of the two wireless communicators 20 and 30 so as to be displaced from each other in the front-back direction as described above, blockage of radio waves by the antenna 22 of the first wireless communicator 20 to the second wireless communicator 30 can be mitigated to maintain good communication stability.

In addition to the influence of the interaction between the antennas 22 and 32, deterioration of the communication sensitivity of the antennas 22 and 32 may also be affected by radio-wave shielding by metal members arranged around the antennas 22 and 32. In the present embodiment, since the holding frame 16 and the coupling frame 18 made of metal as well as the control board 17 provided with conductor wiring, electronic parts, etc. are arranged around the wireless communicators 20 and 30, radio wave shielding by these members affects more rather than the radio wave shielding by the antennas.

Therefore, in the present embodiment, the antennas 22 and 32 are arranged as follows with respect to the holding frame 16, the control board 17, and the coupling frame 18.

Figure 6:
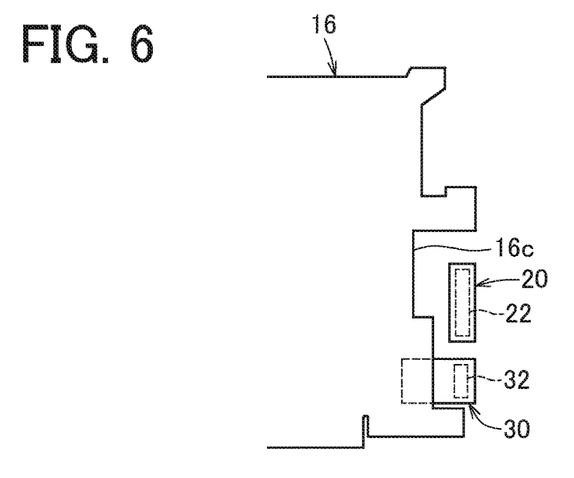
FIG. 6 is a diagram illustrating the arrangement of respective antennas with respect to a holding frame as viewed from the display operation screen side.
Figure 7:
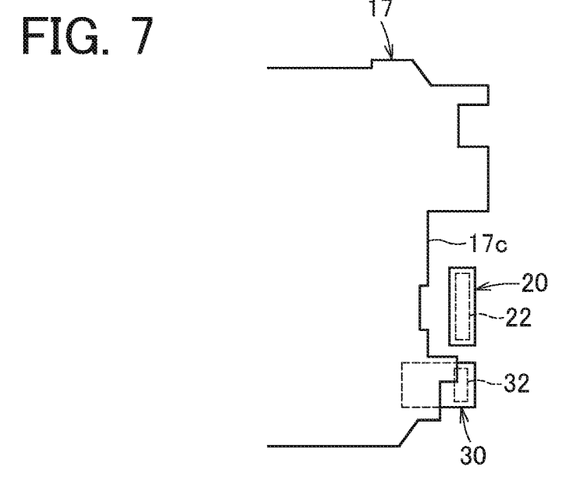
FIG. 7 is a diagram illustrating the arrangement of respective antennas with respect to a control board as viewed from the display operation screen side.
Figure 8:
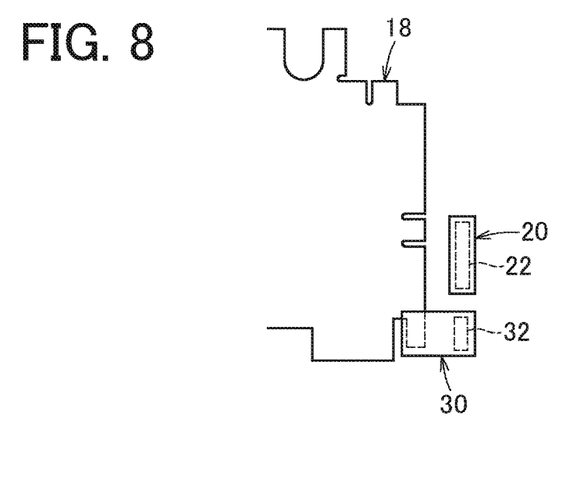
FIG. 8 is a diagram illustrating the arrangement of respective antennas with respect to a coupling frame as viewed from the display operation screen side.

FIG. 6 is a diagram illustrating the arrangement of the antennas 22 and 32 with respect to the holding frame 16, FIG. 7 is a diagram illustrating the arrangement of the antennas 22 and 32 with respect to the control board 17, and FIG. 8 is a diagram illustrating the arrangement of the antennas 22 and 32 with respect to the coupling frame 18. FIGS. 6 to 8 are all diagrams viewed from the display operation screen 15a side.

First, the first wireless communicator 20 is arranged at substantially the same height as the height of the holding frame 16. The antenna 22 of the first wireless communicator 20 is arranged outside the outer peripheral edge of the holding frame 16 as viewed from the display operation screen 15a side as illustrated in FIG. 6 so as not to overlap with the holding frame 16 at all. As described above, since the antenna 22 of the first wireless communicator 20 is arranged so as not to overlap the holding frame 16, the influence of the holding frame 16 on the communication sensitivity of the first wireless communicator 20 can be mitigated. Note that the first wireless communicator 20 is arranged above the control board 17 and the coupling frame 18, and thus regardless of being overlapped with each other or not, the control board 17 or the coupling frame 18 barely affects the communication sensitivity of the first wireless communicator 20.

Next, the second wireless communicator 30 is arranged above the coupling frame 18 like the first wireless communicator 20 (see FIG. 8), and thus the coupling frame 18 barely affects the communication sensitivity of the second wireless communicator 30. Contrarily, the second wireless communicator 30 is arranged below the holding frame 16 and the control board 17. However, as illustrated in FIG. 6, the antenna 32 of the second wireless communicator 30 is arranged so as not to overlap with the holding frame 16 at all (outside the outer peripheral edge of the holding frame 16), whereas as illustrated in FIG. 7 the second wireless communicator 30 is arranged such that the most part of the antenna 32 of the second wireless communicator 30 does not overlap with the control board 17 (outside the outer peripheral edge of the control board 17). As a result of this, the influence by the holding frame 16 or the control board 17 on the communication sensitivity of the second wireless communicator 30 can be mitigated.

In this manner, at least a part of each of the antennas 22 and 32 is arranged to be displaced outside the outer peripheral edges of the holding frame 16 or the control board 17 so as not to overlap with the holding frame 16 or the control board 17, and thus the influence by the holding frame 16 or the control board 17 on the communication sensitivity can be mitigated.

In the holding frame 16 and the control board 17, recesses 16c and 17c are formed on the outer peripheral edges of the holding frame 16 and the control board 17, respectively, and at positions corresponding to the recesses 16c and 17c (inside the recesses 16c and 17c), an antenna of at least one of the first wireless communicator 20 and the second wireless communicator 30 is arranged. By arranging at least one of the antennas 22 and 32 at positions corresponding to the recesses 16c and 17c in this manner, as compared to the case where no recesses 16c or 17c are formed, the antennas 22 and 32 can be arranged on an inner side with respect to outermost part of the holding frame 16 or the control board 17. This enables downsizing of the display-and-operation device 7.

As described above, according to the configuration of the present embodiment, by arranging the two wireless communicators 20 and 30 built in the display-and-operation device 7 on the same single side of the display operation screen 15a, the installation positions of the wireless communicators can be integrated. This can downsize the display-and-operation device 7. In particular, in a configuration in which an operation input means of the display-and-operation device 7 is only the display operation panel 15 of a touch panel type and no other operation input means such as a hard button is provided as in the present embodiment, securing a large area of the display operation screen 15a in the entire display-and-operation device 7 makes it difficult to secure spaces for installing the wireless communicators. However, adopting the configuration of the present embodiment allows spaces for installing the wireless communicators to be secured while the area of the display operation screen 15a is increased, and in addition, the display-and-operation device 7 can be downsized.

Note that embodiments of the present disclosure are not limited to the above-described embodiments, and it goes without saying that various modifications can be made without departing from the gist of the present disclosure.

In the above-described embodiments, the NFC and the Bluetooth are used as examples of communication systems of the wireless communicators; however, other communication systems may be used. Moreover, the wireless communicators may perform wireless communication with a communication object such as a non-contact type integrated circuit (IC) card in addition to a smartphone and a tablet terminal. The number of wireless communicators (antennas) arranged around the display operation screen may be larger than or equal to three. The plurality of wireless communicators arranged may have the same communication system or the same communicable range. Furthermore, embodiments of the present disclosure are not limited to a display-and-operation device the angle of which is adjustable, but is also applicable to a display-and-operation device having no function of angle adjustment.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. A display-and-operation device configured to attach to a main body of an image forming apparatus, the display-and-operation device comprising:
 a housing separate from the main body;
 a display operation panel having a rectangular shape with long sides and short sides, the display operation panel configured to form a display operation screen;
 a plurality of wireless communicators within the housing of the display-and-operation device such that the plurality of wireless communicators are adjacent to each other in a same one of the short sides of the display operation panel, the plurality of wireless communicators each having an antenna to perform wireless communication with a communication object; and
 a control board to control the display operation panel, the control board included in the housing.

2. The display-and-operation device according to claim 1, wherein the plurality of wireless communicators has different communication systems from each other.

3. The display-and-operation device according to claim 1, wherein the plurality of wireless communicators performs wireless communication with the communication object placed close to the housing.

4. The display-and-operation device according to claim 3, wherein
 one of the plurality of wireless communicators has a shorter communication range, with respect to the communication object, than a communication range of another of the plurality of wireless communicators, and
 the one of the plurality of wireless communicators having the shorter communication range is arranged on a side at which the communication object is placed close to the housing, with respect to the control board.

5. The display-and-operation device according to claim 1, wherein the antenna of each of the plurality of wireless communicators are arranged to be displaced from each other when viewed from a side at which the display operation screen is disposed.

6. The display-and-operation device according to claim 1, wherein at least a part of the antenna of each of the plurality of wireless communicators is arranged outside an outer peripheral edge of the control board as viewed from a side at which the display operation screen is disposed.

7. The display-and-operation device according to claim 6, wherein a recess is formed on the outer peripheral edge of the control board, and
 at least a part of the antenna of each of the plurality of wireless communicators is arranged at a position corresponding to the recess of the control board as viewed from the side at which the display operation screen is disposed.

8. The display-and-operation device according to claim 1, further comprising:
 a holder made of metal to hold the display operation panel, wherein
 at least a part of the antenna of each of the plurality of wireless communicators is arranged outside an outer peripheral edge of the holder as viewed from a side at which the display operation screen is disposed.

9. The display-and-operation device according to claim 8, wherein
 a recess is formed on the outer peripheral edge of the holder, and
 at least a part of the antenna of each of the plurality of wireless communicators is arranged at a position corresponding to the recess of the holder as viewed from the side at which the display operation screen is disposed.

10. The image forming apparatus comprising the display-and-operation device according to claim 1.

11. The display-and operation device according to claim 1, wherein the plurality of wireless communicators each are configured to perform the wireless communication with the communication object according to different ones of a plurality of communication protocols.

12. The display-and-operation device according to claim 11, wherein the plurality of wireless communicators comprise:
 a first wireless communicator having a first antenna, the first wireless communicator configured to communicate via a first one of the plurality of communication protocols; and
 a second wireless communicator having a second antenna, the second wireless communicator configured to communicate via a second one of the plurality of communication protocols different from the first one of the plurality of communication protocols.

13. The display-and-operation device according to claim 12, wherein
 the first one of the plurality of communication protocols is a near field communication NFC protocol, and
 the second one of the plurality of communication protocols is a Bluetooth protocol.

14. The display-and-operation device according to claim 12, wherein
 the housing includes a front cover and a rear cover,
 the first wireless communicator is mounted to a backside of the front cover, and
 the second wireless communicator is mounted to the control board.

15. The display-and-operation device according to claim 14, wherein the display operation panel, the control board and a coupling frame are sequentially arranged between the front cover and the rear cover of the housing.

16. The display-and-operation device according to claim 15, wherein the control board and the coupling frame include recesses on outer peripheral edges thereof and the first antenna and the second antenna each include at least a portion arranged at a position corresponding to the recesses as viewed from a side at which the display operation screen is disposed.

17. The display-and-operation device according to claim 12, the first wireless communicator and the second wireless communicator are each mounted in the same one of the short sides of the display operation panel such that, when a user approaches the display operation screen, the first wireless communicator and the second wireless communicator are in a right side of the display operation screen from a perspective of the user.

* * * * *